United States Patent [19]

Zygraich et al.

[11] 3,897,549
[45] July 29, 1975

[54] HERPES SIMPLEX TYPE 2 VIRUS VACCINE AND METHOD OF PRODUCTION AND USE

[75] Inventors: Nathan Zygraich, Brussels; Constant Huygelen, Huldenberg, both of Belgium

[73] Assignee: Recherche et Industrie Therapeutiques, Belgium

[22] Filed: Mar. 7, 1974

[21] Appl. No.: 448,850

[30] Foreign Application Priority Data
Mar. 30, 1973   United Kingdom............... 15307/73

[52] U.S. Cl..................... 424/89; 195/1.1; 195/1.3; 195/1.5
[51] Int. Cl........................... C12k 5/00; C12k 7/00
[58] Field of Search....................................... 424/89; 195/1.1–1.8

[56] References Cited
FOREIGN PATENTS OR APPLICATIONS
48,621   7/1973   Japan
2,215,728  10/1973  Germany

OTHER PUBLICATIONS

Timbury, Mc. J. Gen. Virol. 13: 373–376 (1971) "Temperature-Sensitive Mutants of Herpes Simplex Virus Type 2".

Schaffer, P. A. et al. Virology 52 (1): 57–71 (Mar. 1973) "Temperature-Sensitive Mutants of Herpes Simplex Virus Type 1"; Virology 42: 1144–1146 (1970).

Halliburton, I. W. et al Virology 54 (1): 60–68 (July 1973) "Characterization of Temperatures–Sensitive Mutants of Herpes Simplex Virus Type 2".

Munoz N. Oncogenesis Herpes Viruses, Proc. Symp. 1971 (pub 1972) 443–446 "Effect of Hormonal Imbalance and Herpes Virus Type 2 on the uterine cervix of the mouse".

Esparza, J. et al Virology 57(2): 554–565 (1974) "Isolation, Complementation, and Preliminary Phenotypic Characterization of Temperature-Sensitive Mutants of Herpes Simplex Virus Type 2".

Primary Examiner—Shep K. Rose
Attorney, Agent, or Firm—Alan D. Lourie; William H. Edgerton

[57] ABSTRACT

The invention pertains to the preparation of temperature-sensitive and substantially non-pathogenic mutant strains of Herpes Simplex type 2 virus which are valuable for the preparation of vaccines, to the vaccines containing said temperature-sensitive mutant strains and to a new vaccination method against viral exanthermatous diseases.

6 Claims, No Drawings

HERPES SIMPLEX TYPE 2 VIRUS VACCINE AND METHOD OF PRODUCTION AND USE

The present invention relates to the preparation of temperature-sensitive (ts) and substantially non-pathogenic mutant strains of Herpes Simplex type 2 virus which are valuable for the preparation of vaccines, to the vaccines containing said temperature-sensitive (ts) mutant strains and to a new vaccination method against viral exanthematous diseases.

Essentially, the in vitro replication of a temperature-sensitive (ts) mutant strain is handicapped at nonpermissive temperatures, i.e. above its cut-off temperature (i.e. the temperature at which the infectivity is significantly reduced). Although results obtained in vitro cannot necessarily be extrapolated to what occurs in vivo, some reports suggest that, in vivo, ts mutants behave differently from wild viruses (B. R. Murphy, E. G. Chalhub, S. R. Nusinoff and R. M. Chanock, J. of Inf. Dis. 126, N° 2, 170–78, 1972). This phenomenon has been applied to the development of some live virus vaccines against respiratory diseases. At the best ts conditions, a ts mutant with a cut-off temperature in the range of the normal body temperature should be able to multiply in the mucosae of the upper respiratory tract (where the temperature is several degrees C lower than that of the lower respiratory tract and body) while its replication would be partially or completely inhibited in the lower respiratory tract and in the body. Studies in laboratory animals and in man have shown that, at least for some respiratory viruses, this theoretical approach is confirmed by the experimental findings (for instance, N. Zygraich, M. Lobmann and C. Huygelen, J. Hyg. Camb. 70, 229–234, 1972). Nevertheless, and more particularly because of this high specificity existing in this field, it was not obvious that the same principle could be applied to other viruses, more particularly Herpes virus, e.g. Herpes Simplex type 2 virus. Moreover, it was not obvious that, by making use of the difference between the temperature of the body and the temperature of the skin, it was possible to perform vaccination by intradermic administration of a temperature-sensitive Herpes virus strain.

It is known that some Herpes viruses (e.g. Herpes Simplex type 2 virus) are viruses which produce delayed illness and may remain in the organism for an indefinite period after the patient has recovered from initial ilness. It is also known that the immunity induced by Herpes viruses is poor and of short duration. Therefore, the development of Herpes viruses vaccines is encountering two major obstacles for what regards efficacity and innocuity; efficacity because the natural illness poorly protects the organism against reinfection and innocuity because the latency of this virus provokes recurrence of the illness.

The present invention circumvents those obstacles and essentially consists in preparing and isolating Herpes virus temperature-sensitive mutant strains and inoculating at least one such temperature-sensitive mutant strain at a cold site of the organism such as mucosa or the skin and more particularly by intradermic route (e.g. by scarification).

The vaccination method of this invention is examplified for Herpes Simples type 2 virus but it relates to a vaccination method against any exanthematous viral disease and consists in administering by a cold route to a susceptible organism -and preferably by intradermic route, e.g. by scarification- an effective dose of a temperature-sensitive and substantially non-pathogenic mutant strain of the virus responsible for said exanthematous disease. Examples of exanthematous diseases are smallpox, smallpox-related viral infections of man, cowpox, varicella, zoster, measles, rubella, Herpes Simplex infections and Herpes B virus infections.

We have found that when using such route of inoculation, the vaccine virus growth is limited to the cold regions of the body and the protection is conferred in the absence of detectable humoral sero-neutralizing antibodies.

Nevertheless, the whole vaccinated organism is undoubtedly broadly protected by this vaccination method. We have indeed surprisingly found that such intradermic vaccination does protect the vaccinated organism against reinfection either by a peripheral centripete route or at a completely different and warmer site of said organism, e.g. in the brain.

For preparing, according to the invention, the temperature-sensitive mutant strain of Herpex Simplex type 2 virus useful for vaccine production, either a Herpes Simplex type 2 virus strain isolated from a clinical case or a Herpes Simplex type 2 virus strain obtained at the end of serial passages in tissue culture such as for instance primary rabbit kidney cells may be used as starting material.

According to the invention, the induction of a temperature-sensitive and substantially non-pathogenic mutant strain of Herpes Simplex type 2 virus is performed from a pathogenic strain of Herpes Simplex type 2 virus by bringing said pathogenic Herpes Simplex type 2 virus strain into contact at a pH comprised between four and five with a buffered aqueous solution of nitrous acid and isolating the so-obtained temperature-sensitive mutant strain. The buffered aqueous solution of nitrous acid is preferably nitrous acid in acetic buffer, the concentration of nitrous acid and acetate ion in the reaction medium being N and N/4 respectively, the contact being then maintained for 1 to 15 minutes; preferably the contact is maintained for 3 minutes (±1) at a pH of 4.6 (±0.1) at room temperature and thereafter for 8 minutes (±1) at a pH of 4.2 (±0.1) at room temperature.

The so-obtained temperature-sensitive (ts) mutant strain is then isolated by cloning it at least one time in a tissue culture known to the art for accepting growth of Herpes Simplex type 2 virus and acceptable as a substrate for vaccine production such as chicken embryo fibroblasts, human embryo fibroblasts or primary rabbit kidney cell cultures (e.g. by cloning it twice in primary rabbit kidney (PRK) cell cultures originating from a SPF (specific pathogen free) colony and after a six day incubation period at a temperature comprised between 30° and 37° C (±1° C), e.g. at 35° C).

For preparing a vaccine according to the invention, the temperature-sensitive mutant strain of Herpes Simplex type 2 virus -obtained as indicated above- is inoculated into a primary rabbit kidney (PRK) cell culture at a temperature not exceeding 37° C (±1° C) and preferably at 35° C (±1° C) and incubated for a period of time sufficient to allow growth of a large amount of said virus, and harvesting the resulting virus material.

The so-obtained Herpes Simplex type 2 virus vaccine is administered by a cold route -and preferably by intradermic route, to a susceptible organism at the appropriate dosage, e.g. at least $10^3$ TCID$_{50}$ (tissue culture infective dose 50 %).

For vaccinal use, the virus is preferably kept in freeze-dried form and the vaccine is extemporaneously reconstituted by addition of either water or any other pharmaceutical diluent or composition known to the art for the preparation of parenteral preparations.

The following examples illustrate the invention starting from a strain of Herpes Simplex type 2 virus which has been assigned the 'Herpes 2 parental' designation in the applicant's collection. Two ts mutant strains of Herpes Simplex type 2 virus obtained from the Herpes 2 parental strain have been assigned the 'Herpes 2 ts 1' and 'herpes 2 42082' designations respectively in the applicant's collection but it is obvious that these examples are not limitative of the invention. The process for inducing ts mutant strain as well as the vaccine obtained therefrom are obviously applicable to any Herpes Simplex type 2 virus strain.

EXAMPLE 1

Primary rabbit kidney cell cultures are prepared from kidneys of three to six weeks old rabbits (derived from a specific pathogen free colony) using a growth medium consisting of Hanks solution supplemented with lactalbumin hydrolysate (0.5%) and calf serum (10 %).

Wild Herpes Simplex type 2 virus strain Herpes 2 parental is passaged twice in said primary rabbit kidney tissue cultures using a maintenance medium consisting of Eagle's medium supplemented with agamma calf serum (2 %) (a product manufactured and sold by HYLAND TRAVENOL Labs., Los Angeles, California, USA), and the supernatant of the last passage is harvested to yield a virus suspension containing $10^{5.5}$ TCID$_{50}$ per ml.

One ml. of this virus suspension is mixed with 0.5 ml. of a 4 M sodium nitrite aqueous solution in 0.5 ml. of molar acetic acid/sodium acetate buffer (prepared by mixing of glacial acetic acid (6 g.) up to 100 ml. with distilled water and three volumes of a solution of sodium acetate (13.6 g) in 100 ml. of distilled water, both solutions being sterilized for 30 minutes at 121° C), the final pH being 4.6.

The mixture is allowed to react for three minutes at room temperature and the reaction is then stopped by dropwise addition of normal sodium hydroxide with stirring up to reaching pH 7.5 (±0.5). The pH adjustment is followed by changing of color of the phenol red indicator present in the virus suspension.

The medium is immediately dialyzed for five hours at +4° C (±1) against phosphate buffer saline (consisting of NaCl (8 g); KCl (0.2 g); Na$_2$HPO$_4$ (1.15 g); KH$_2$PO$_4$ (0.2 g) in distilled water (up to 800 ml.) mixed with a solution of MgCl$_2$.6H$_2$O in 100 ml. of distilled water and thereafter with a solution of CaCl$_2$ (0.1 g) in 100 ml. of distilled water, the final solution being sterilized by filtration, the final pH being comprised between 7.2 and 7.4), this latter being renewed several times up to elimination of the nitrite anion. A part of the sample is titrated and the remaining is stored at −70° C. The titration is performed by the tube end-point dilution method after a seven day incubation period in primary rabbit kidney tissue culture at the non-permissive temperature (38.5°C/ + 1° C) using two tubes per dilution.

The sample stored at −70° C is diluted to contain 1 TCID$_{50}$/0.2 ml. This diluted sample is inoculated in 24 primary rabbit kidney tissue culture tubes using 0.1 ml. inoculum per tube. The tubes are incubated at the permissive temperature (35°C/±1° C). After various incubation periods ranging from four to ten days, 16 inoculated tubes show a typical Herpes cytopathogenic effect; these tubes are labelled 1 to 16 and stored at −70° C. Parallel titrations of these 16 positive samples are performed at the permissive temperature (35° C) and at the non-permissive temperature (39° C). Samples exhibiting a significant difference in titer between the permissive and the non-permissive temperatures are further cloned by end dilution passages.

In this way, by pooling the positive tubes at the $10^{-4}$ dilution of sample N° 4, (i.e. incubated for five days) a suspension of a strain labelled Herpes 2 ts 1 is obtained.

EXAMPLE 2

Herpes 2 ts 1 virus strain obtained in example 1 is passaged once in primary rabbit kidney tissue cultures, and the supernatants are harvested to yield a virus suspension containing $10^{5.3}$ TCID$_{50}$ per ml.

One ml. of this virus suspension is mixed with 0.5 ml. of a 4 M sodium nitrite aqueous solution in 0.5 ml. of molar acetic acid/sodium acetate buffer (prepared by mixing of glacial acetic acid (6 g.) up to 100 ml. with distilled water and three volumes of a solution of sodium acetate (13.6 g.) in 100 ml. of distilled water, both solutions being sterilized for 30 minutes at 121° C), the final pH being 4.2.

The mixture is allowed to react for eight minutes at room temperature and the reaction is then stopped by dropwise addition of normal sodium hydroxide with stirring up to reaching pH 7.5 (±0.5). The pH adjustment is followed by changing of color of the phenol red indicator present in the virus suspension.

The medium is immediately dialyzed for five hours at +4° C (±1° C) against phosphate buffer saline (consisting of NaCl (8 g.); KCl (0.2 g.); Na$_2$HPO$_4$ (1.15 g.); KH$_2$PO$_4$ (0.2 g.) in distilled water (up to 800 ml.) mixed with a solution of MgCl$_2$.6H$_2$O in 100 ml. of distilled water and thereafter with a solution of CaCl$_2$ (0.1 g.) in 100 ml. of distilled water, and final solution being sterilized by filtration, the final pH being comprised between 7.2 and 7.4), this latter being renewed several times up to elimination of the nitrite anion. A part of the sample is titrated and the remaining is stored at −70° C. The titration is performed by the tube end-point dilution method after a seven day incubation period in primary rabbit kidney tissue culture at the non-permissive temperature (38° C/± 1° C) using two tubes per dilution.

The sample stored at −70° C. is diluted to contain 1 TCID$_{50}$10.2 ml. This diluted sample is inoculated in 17 primary rabbit kidney tissue culture tubes using 0.1 ml. inoculum per tube. The tubes are incubated at the permissive temperature (35° C/ ±1° C). After various incubation periods ranging from four to ten days, 12 inoculated tubes show a typical Herpes cytopathogenic effect; these tubes are labelled 1 to 12 and stored at −70°C. Parallel titrations of these 12 positive samples are performed at the permissive temperature (35° C) and at the non-permissive temperature (39° C). Samples exhibiting a significant difference in titer between the permissive and the non-permissive temperatures are further cloned by end dilution passages.

In this way, by pooling the positive tubes at the $10^{-4}$ dilution of sample N° 7, a suspension of a strain labelled Herpes 2 42082 is obtained.

EXAMPLE 3

Ts Character of Herpes 2 ts 1 and Herpes 2 42082 Strains

Virus growth at different temperatures has been determined by titration. The results are summarized by Table I, indicating a cut-off temperature (temperature at which the infectivity is reduced of at least 2 $\log_{10}$) of 38.5° C (±0.5°C). The difference in yield between strains Herpes 2 ts 1 and Herpes 2 42082 and the strain Herpes 2 parental is shown in Table I.

TABLE I

GROWTH DIFFERENCE OF TS MUTANTS 'HERPES 2 TS 1' AND 'HERPES 2 42082' AND PARENT STRAIN 'HERPES 2 PARENTAL' AT VARIOUS TEMPERATURES

| Virus strain | Virus yield, percent of that at 35° C | | | |
|---|---|---|---|---|
| | 37.5 | 38 | 38.5 | 39 |
| 'Herpes 2 ts 1' | 10 | 10 | <0.1 | 0.0 |
| 'Herpes 2 42082' | <4 | <0.4 | <0.4 | 0.0 |
| 'Herpes 2 parental' | 100 | 100 | 100 | 10 |

EXAMPLE 4

Comparative Neuro-pathogenicity, Antigenicity and Immunogenicity of Herpes 2 Parental and Herpes 2 TS 1 (Testing in Rabbits).

a. Inoculation of Herpes 2 ts 1 by the intradermal and intramuscular routes.

Thirty rabbits were used in this experiment. They were divided in groups of five animals each. Group I received 1 ml. ($10^{5.5}$ $TCID_{50}$) of Herpes 2 ts 1 intradermally at different sites of the ventral region; group II received the same inoculum intramuscularly in the right hind leg. Groups III and IV were given Herpes 2 parental by the intradermal and intramuscular routes. Groups V and VI were uninoculated controls.

The symptoms were recorded daily for 35 days postinoculation, and a score from 0 to 3 was given according to the severity of the nervous symptoms observed. The results are summarized in Table II. No symptom was observed in any of the rabbits inoculated with the ts mutant.

In group III two animals remained symptom-free; the three others showed varying degrees of nervous symptoms and one of them (No. 24) was sacrificed on the 12th postinoculation day. All the animals of group IV which had received Herpes 2 parental intramuscularl showed pronounced nervous symptoms after an incubation period of seven to eight days. Two of them (No. 26, 28) were sacrificed; one died as a result of the inoculation, on the 9th postinoculation day; one showed transient symptoms but died accidentally after bleeding by heart puncture on the 33rd postinoculation day.

b. Challenge inoculation with Herpes 2 parental

All surviving animals received a challenge inoculation by the intramuscular route in the left hind leg with $10^{5.5}$ $TCID_{50}$ in 1 ml. on the 35th day.

The symptoms were recorded daily for 19 days p.i. The results are summarized in Table III.

TABLE III

Nervous symptoms in rabbits immunized with different inocula and challenged 35 days later with 'Herpes 2 parental' by the intramuscular route($10^{5.5}$ $TCID_{50}$ per animal).

| Groups | Strain used for primary immunization | Route used for primary inoculation | Number surviving animals | Number of animals showing indicated degree of nervous symptoms. Score: 0 | 1 | 2 | 3 |
|---|---|---|---|---|---|---|---|
| I | 'Herpes | ID | 5 | 5 | — | — | — |
| II | 2 ts 1' | IM | 5 | — | 3 | 1 | — |
| III | 'Herpes 2 | ID | 4 | 3 | 1 | — | — |
| IV | parental' | IM | 1 | — | — | — | 1 |
| V + VI | controls | — | — | 1 | 3 | 1 | 5 |

ID = intradermal
IM = intramuscular

In group I no symptom was observed (one animal died after heart puncture on the 11th day). In group II four out of five animals showed some degree of nervous involvement.

In group III three out of the four remaining animals remained symptom-free; one showed transient paresis of the hind legs. In group IV only one animal survived (No. 27); it had shown paresis of the right hind leg for five weeks after the first inoculation; it showed the same symptoms again on the 9th day after challenge and was found dead on the 10th day.

In the control groups only one out of ten rabbits failed to present nervous symptoms; all others showed

TABLE II

Nervous symptoms in rabbits inoculated with 'Herpes 2 ts 1' and 'Herpes 2 parental' by different routes

| Groups | Strain | Number of animals | Route of inoculation | Titer of inoculum ($TCID_{50}$) | Number of animals showing indicated degree of nervous symptoms. Score: 0 | 1 | 2 | 3 |
|---|---|---|---|---|---|---|---|---|
| I | 'Herpes 2 | 5 | ID | $10^{5.5}$ | 5 | — | — | — |
| II | ts 1' | 5 | IM | $10^{5.5}$ | 5 | — | — | — |
| III | 'Herpes 2 | 5 | ID | $10^{5.3}$ | 2 | 1 | 1 | 1 |
| IV | parental' | 5 | IM | $10^{5.3}$ | — | — | 2 | 3 |
| V + VI | controls | 10 | — | — | — | — | — | — |

Score: 0 means normal; 1 means slight paresia; 2 means marked paresia; 3 means paralysis ID = intradermic route
IM = intramuscular route paresis or paralysis of varying severity and four of them died between the 10th and 15th days p.i.

c. Virus reisolation

Attempts were made to recover virus from some animals which died after challenge or were sacrificed. The results are shown in Table IV.

TABLE IV

| | Group | No. animals | Symptoms post-challenge | Brain taken x days post-challenge | Virus titer per gram of brain material |
|---|---|---|---|---|---|
| Immunized animals | I | 1 | 0 | x = 32 | Neg. |
| | | 2 | 0 | | 12 | '' |
| | | 4 | 0 | | 41 | '' |
| | | 5 | 0 | | 19 | '' |
| | II | 7 | + | | 20 | '' |
| | | 9 | + | | 30 | '' |
| | | 10 | ++ | | 19 | '' |
| Controls | V+VI | 31 | +++ | | 10 | $10^{2.7}$ |
| | | 35 | +++ | | 12 | $10^{3.5}$ |
| | | 36 | +++ | | 14 | $10^{2.7}$ |
| | | 40 | +++ | | 15 | $10^{1.7}$ |

No virus was recovered from brain material from animals which had been previously inoculated with Herpes 2 ts 1, whereas virus titers between $10^{1.7}$ and $10^{3.5}$ TCID$_{50}$ were found per gram of brain material in all four control animals whose brains were tested for the presence of virus.

d. Serological findings

Serum was obtained on the following days post-challenge: 0, 11, 19 and 32. The results of the sero-neutralization (SN) tests are summarized in Table V.

Table V

SN TITERS IN RABBITS AFTER CHALLENGE WITH 'HERPES 2 PARENTAL'

| Strain | Group | Route of inoculation | SN titer at different post-challenge periods (expressed in days) | | | | | | | |
|---|---|---|---|---|---|---|---|---|---|---|
| | | | 0 | | 11 | | 19 | | 32 | |
| | | | Ratio | G.M. log$_2$ | Ratio | G.M. log$_2$ | Ratio | G.M. log$_2$ | Ratio | G.M. log$_2$ |
| 'Herpes 2 ts 1' | I | ID | 0/5 | 0 | 3/5 | 1.6 | 3/3 | 4 | 3/3 | 5 |
| | II | IM | 0/5 | 0 | 3/5 | 1.2 | 5/5 | 3.4 | 2/2 | 5 |
| 'Herpes 2 parental' | III | ID | 4/4 | 4 | 4/4 | 5.5 | 4/4 | 5.2 | 4/4 | 5.2 |
| Controls | V + VI | — | 0/10 | 0 | 9/10 | 2.7 | 6/6 | 3.8 | 6/6 | >5 |

Ratio = number of animals with detectable positive titer on number of animals tested.
G.M. = geometric mean.
Day 0 post-challenge = day 35 after primary inoculation.

No antibodies were detected in the animals which had been inoculated with Herpes 2 ts 1 35 days post-inoculation; all four animals in group III which had received Herpes 2 parental by the intradermic route had seroconverted. After challenge all animals developed SN antibodies. The geometric mean SN titers of the animals in groups I and II (pre-immunized with ts) and those of the control animals were similar.

EXAMPLE 5

Innocuity and Immunogenicity of Herpes 2 42082 by Intramuscular and Intradermal Routes.

Five groups of 20 mice each were used to investigate the immunity status of mice having received a previous inoculation of a ts mutant. The first group of mice were inoculated intramuscularly (IM) with $10^{5.5}$ TCID$_{50}$ of Herpes 2 42082. The second group received $10^{4.5}$ TCID$_{50}$ of the same virus strain. The next two groups were inoculated intradermally (ID) with $10^{5.5}$ and $10^{4.5}$ TCID$_{50}$ respectively. The fifth group served as a control group. In group I one mouse died; the mortality was four and three in groups III and IV respectively.

Two mice in each group were bled 14 days post inoculation; their SN titers remained below the detectable level (<4).

Fourteen days p.i. all animals were challenged with the parent strain (Herpes 2 parental) in each group half of the remaining animals were inoculated intracerebrally ($10^{4.5}$ TCID$_{50}$) and the other half intradermally ($10^{5.5}$ TCID$_{50}$). The results are summarized in Table VI.

TABLE VI

| Inoculation route | Group | Dose per animal (primary inoculation) | Number of animals | Nbr animals surviving primary inoculation | Nbr animals resisting challenge/ Nbr challenged. Route of challenge | |
|---|---|---|---|---|---|---|
| | | | | | IC | D |
| IM | I | $10^{5.5}$ | 20 | 19 | 5/9 | 6/8 |
| | II | $10^{4.5}$ | 20 | 20 | 1/9 | 7/7 |
| ID | III | $10^{5.5}$ | 20 | 16 | 7/7 | 5/5 |
| | IV | $10^{4.5}$ | 20 | 17 | 8/8 | 7/7 |
| Controls | V | — | 20 | 20 | 0/9 | 0/7 |

All control mice died as a result of the challenge inoculation. In the mice immunized intradermally all mice were protected. In those which had received the ts mutant strain intramuscularly there was a partial protection. Five out of 9 and one out of 9 mice survived the intracerebral challenge inoculation in groups I and II respectively. The animals in the same groups which had received the intradermal challenge inoculation showed a higher degree of resistance: 6 of 8 and 7 out 0f 7 respectively.

EXAMPLE 6

The suspension of strain Herpes 2 42082 obtained at the end of example 2 is distributed into glass vials, in order to get $10^3$ to $10^5$ TCID$_{50}$ per vial. The vials are freeze-dried and sealed in order to constitute single vaccine doses.

After reconstitution by addition of water, the vaccine is administered by intradermal route, e.g. by sacrification.

What we claim is:

1. A vaccination method broadly protective of the whole vaccinated organism against Herpes Simplex type 2, an exanthematous viral disease, consisting of administering into the upper respiratory tract, mucosa, or skin of a susceptible organism an effective dose of at least $10^3$ TCID$_{50}$, protective against reinfection at warmer sites, of a temperature-sensitive and substantially non-pathogenic nitrous acid mutant strain of a Herpes Simplex type 2 virus responsible for said exanthematous viral disease, said mutant capable of multiplying at skin temperature and in the mucosa of the upper respiratory tract but having partially or completely inhibited replication in the lower respiratory tract and in the body.

2. A method according to claim 1, in which the route of administration is intradermal.

3. A method according to claim 2, in which the route of administration is intradermal scarification and the dose is at least $10^{4.5}$ TCID$_{50}$.

4. A Herpes Simplex type 2 virus vaccine comprising as active ingredient at least $10^3$ TCID$_{50}$ of a nitrous acid mutant strain of Herpes Simplex type 2 virus strain according to claim 1 and a pharmaceutical diluent.

5. A vaccine according to claim 4, in which the vaccine is freeze-dried.

6. A vaccine according to claim 4, in which the dose is at least $10^{4.5}$ TCID$_{50}$.

* * * * *